(12) United States Patent
Plantan et al.

(10) Patent No.: US 9,322,446 B2
(45) Date of Patent: Apr. 26, 2016

(54) TURBO DRUM FOR DRUM BRAKES

(71) Applicant: Bendix Commercial Vehicle Systems LLC, Elyria, OH (US)

(72) Inventors: Ronald S. Plantan, Elyria, OH (US); Dennis A. Wolf, Jr., Westlake, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 0 days.

(21) Appl. No.: 13/654,031

(22) Filed: Oct. 17, 2012

(65) Prior Publication Data

US 2014/0102838 A1    Apr. 17, 2014

(51) Int. Cl.
*F16D 65/78*    (2006.01)
*F16D 65/827*    (2006.01)

(52) U.S. Cl.
CPC .............. *F16D 65/827* (2013.01); *F16D 65/78* (2013.01)

(58) Field of Classification Search
CPC ............................... F16D 65/827; F16D 65/78
USPC ................. 188/218 R, 250 B, 264 R
See application file for complete search history.

(56) References Cited

U.S. PATENT DOCUMENTS

| | | | |
|---|---|---|---|
| 1,865,311 A * | 6/1932 | Goostray | 188/218 R |
| 1,924,622 A * | 8/1933 | Norton | 188/264 R |
| 1,943,641 A * | 1/1934 | Udale | 188/218 R |
| 2,088,191 A * | 7/1937 | Eksergian | 188/218 R |
| 3,750,854 A * | 8/1973 | Gramley | 188/264 R |
| 5,293,967 A | 3/1994 | Siegrist | |
| 5,440,796 A * | 8/1995 | Deggau et al. | 29/412 |
| 5,826,684 A | 10/1998 | Hester | |
| 6,135,248 A | 10/2000 | Johnson et al. | |
| 6,679,357 B1 | 1/2004 | Jenkinson | |
| 6,786,310 B2 * | 9/2004 | Lin | 188/218 XL |
| 8,181,753 B2 | 5/2012 | Levering et al. | |
| 2003/0047394 A1 | 3/2003 | Hayes et al. | |
| 2003/0178270 A1 | 9/2003 | Vollert et al. | |
| 2012/0118684 A1 | 5/2012 | Pahle | |

OTHER PUBLICATIONS

International Search Report dated Mar. 10, 2014 (Three (3) pages).
Written Opinion (PCT/ISA/237) dated Mar. 10, 2014 (Seven (7) pages).

* cited by examiner

*Primary Examiner* — Bradley King
(74) *Attorney, Agent, or Firm* — Crowell & Moring LLP

(57) ABSTRACT

A drum brake assembly and a drum having an annular drum wall with an open end and an attachment end. The drum wall further includes an outer drum surface and an inner braking surface, each of which extends between the open end and the attachment end. The drum includes a hub attachment section which is attachable to an associated wheel hub. The drum also has a drum wall connection section extending between the attachment end of the drum wall and the hub attachment section, where the drum wall connection section comprises a plurality of radially angled vanes interspersed with a corresponding plurality of air openings.

19 Claims, 4 Drawing Sheets

TURBO DRUM FOR DRUM BRAKES

FIELD OF THE INVENTION

The present invention relates to drum brakes for vehicles, and in particular to a brake drum having turbo-style vanes configured to reduce mechanical and/or thermal stresses on the drum.

BACKGROUND

Drum brakes operate on the principles of converting kinetic energy into heat by creating friction when a set of brake shoes or pads press against an inner surface of a rotating brake drum. However, a common problem with such drum brakes is that uneven mechanical and thermal stresses and uneven cooling tends to cause premature drum cracking (heat cracks) and elevated brake temperatures tend to reduce lining life on brake shoes.

With respect to temperature, it is known that the larger the temperature gradient over a short space, the higher the resulting tension in the material. To combat this, some drums have incorporated narrow cooling fins along the outside of the drum to mitigate this effect, although this has been met with only modest results.

With respect to the mechanical stresses, excess stress is caused when the drum begins to exhibit what is called 'bell mouthing,' which occurs when the open end of the drum experiences a greater degree of expansion than does the hub end of the drum. Such uneven drum expansion places a tremendous amount of mechanical stress on the drum, which again tends to cause cracking and a general reduction of useful life.

Therefore, what is needed is a drum design which alleviates the aforementioned mechanical and thermal stresses that are experienced by the drum of a drum brake.

SUMMARY OF THE INVENTION

Disclosed and claimed herein is a drum brake assembly, a drum for a brake assembly and a method of operating the same. In one embodiment, the drum includes an annular drum wall having an open end and an attachment end. The drum wall further includes an outer drum surface and an inner braking surface, each of which extends between the open end and the attachment end. The drum includes a hub attachment section that is attachable to an associated wheel hub. Finally, the drum has a drum wall connection section extending between the attachment end of the drum wall and the hub attachment section, where the drum wall connection section comprises a plurality of radially angled vanes interspersed with a corresponding plurality of air openings.

Other objects, advantages and novel features of the present invention will become apparent from the following detailed description of the invention when considered in conjunction with the accompanying drawings.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE DRAWINGS

Overview of the Disclosure

As described in more detail below, the present disclosure relates generally to a drum brake assembly and a drum having an annular drum wall with an open end and an attachment end. More particularly, the present disclosure relates to a turbo-style drum having a drum wall connection section extending between the attachment end of the drum wall and a hub attachment section, where the drum wall connection section has a plurality of radially angled vanes interspersed with a corresponding plurality of air openings. Additional details of the preferred embodiments are set forth below with reference to the figures.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, A, B or C means any of the following: A; B; C; A and B; A and C; B and C; A, B and C. An exception to this definition will occur only when a combination of elements, functions, steps or acts are in some way inherently mutually exclusive. Reference throughout this document to "one embodiment", "certain embodiments", "an embodiment" or similar term means that a particular feature, structure, or characteristic described in connection with the embodiment is included in at least one embodiment of the present invention. Thus, the appearances of such phrases in various places throughout this specification are not necessarily all referring to the same embodiment. Furthermore, the particular features, structures, or characteristics may be combined in any suitable manner on one or more embodiments without limitation.

DESCRIPTION OF THE EXEMPLARY EMBODIMENT

Figure 1:
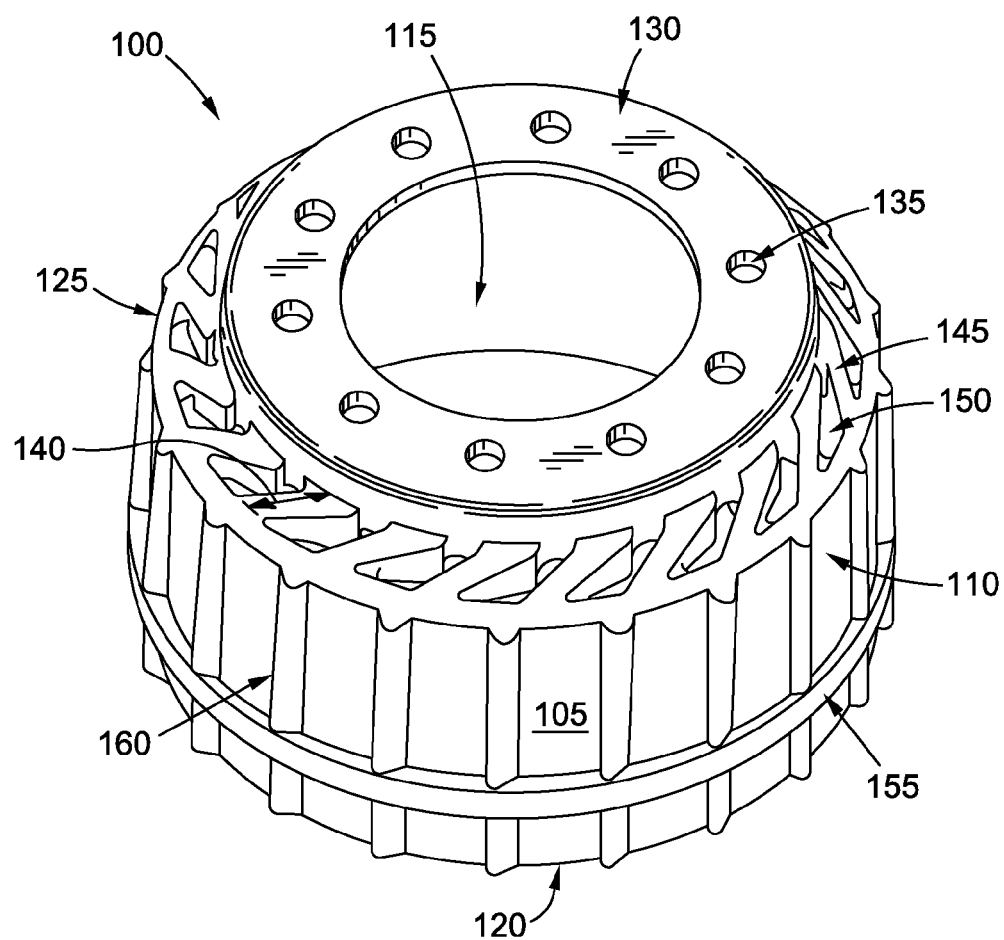
FIG. 1 is an oblique view of a brake drum configured in accordance with the principles of the invention.

Referring now to FIG. 1, depicted is a turbo-style drum 100 comprised of a annular drum wall 105 with an outer drum surface 110 and an inner braking surface 115. The drum wall 105 extends between an open end 120 and an attachment end 125.

The drum of FIG. 1 further comprises a hub attachment section 130 having a plurality of lug holes 135 which are used to secure the drum 100 to a wheel hub (not shown). Of course, other means and structures may be similarly used to secure the drum 100 to an associated wheel hub. Drum 100 is also configured with a drum wall connection section 140 extending between the attachment end 125 of the drum wall 100 and the hub attachment section 130, as shown in FIG. 1. As shown, the hub attachment section 130 comprises a planar surface having an outer diameter from which the drum wall connection section 140 extends. The hub attachment section 130 further comprises an inner diameter forming a primary opening for receiving a wheel hub (not shown).

In order to reduce the aforementioned mechanical stresses and 'bell mouthing' effect, the drum wall connection section 140 is further configured with a plurality of radially angled vanes 145 interspersed with a corresponding plurality of air openings 150. It should be appreciated that the radially angled vanes 145 may be curved in a radially concave or a radially convex manner.

In certain embodiments, the plurality of radially angled vanes 145 are oriented at an angle of between 20 degrees and 50 degrees as measured from an edge of the drum wall (i.e., attachment end 125) from which the plurality of radially angled vanes 145 extend. In certain embodiments, the particular angle may be selected based, at least in part, on the type of material used and/or the amount of desired cooling. In this fashion, the plurality of radially angled vanes 145 facilitate a radial expansion of the attachment end 125 of the drum wall 105 during operational rotation of the drum 100. This radial expansion thereby serves to minimize a difference between a radial expansion of the attachment end 125 of the drum wall 105 and a radial expansion of the open end 120 of the drum wall 105, thereby reducing or eliminating the undesired 'bell mouthing' effect.

While it should be appreciated that the plurality of radially angled vanes 145 may comprises at least two, in certain embodiment it may be preferable to have between 3 and 30 individual values encircling the hub attachment section 130, as shown in FIG. 1. However, it should similarly be appreciated that more or fewer individual vanes may be used consistently with the principles of the invention. Moreover, the number of vanes may depend, at least in part, on the expansion of the material during heating, as well as on the width of the vanes. The chosen ratio of vane-to-air space may also be dependent on the material.

It should further be appreciated that the plurality of radially angled vanes 145 may preferably be curved such that their respective lengths are greater than a radial width of the drum wall connection section 140, thereby enabling additional expansion capacity during operational rotation of the drum 100 without creating large stresses due to differential in temperature from the hub mounting interface (e.g., hub attachment section 130) and high frictional areas (e.g., inner braking surface 115). As a result, the design of drum 100 tends to provide a longer drum life and lining life, as well as provide a lighter weight drum.

Additionally, the air openings 150 serve to facilitate air flow along the inner braking surface 115 of the drum 100, thereby providing a desirable cooling effect as well. As described in more detail below with reference to FIG. 3, a stationary stator piece behind the radially angled vanes 145, either attached directly to the brake or not, may be used to pull air into the brake while the radially angled vanes 145 rotate and further circulate the air.

Continuing to refer to FIG. 1, the drum wall 105 may further comprise a squealer band 155 circumferentially positioned around the outer drum surface 110. Moreover, one or more optional strengthening ribs 160 may be positioned circumferentially around and parallel to the outer drum surface 110, as shown in FIG. 1, in order to provide further reinforcement to the drum wall 105 if needed.

The drum of FIG. 1 may be cast as a unitary construction of a composite drum with steel shell, aluminum with an iron liner, or any other material(s) suitable for constructing drums of drum brakes.

Figure 2:
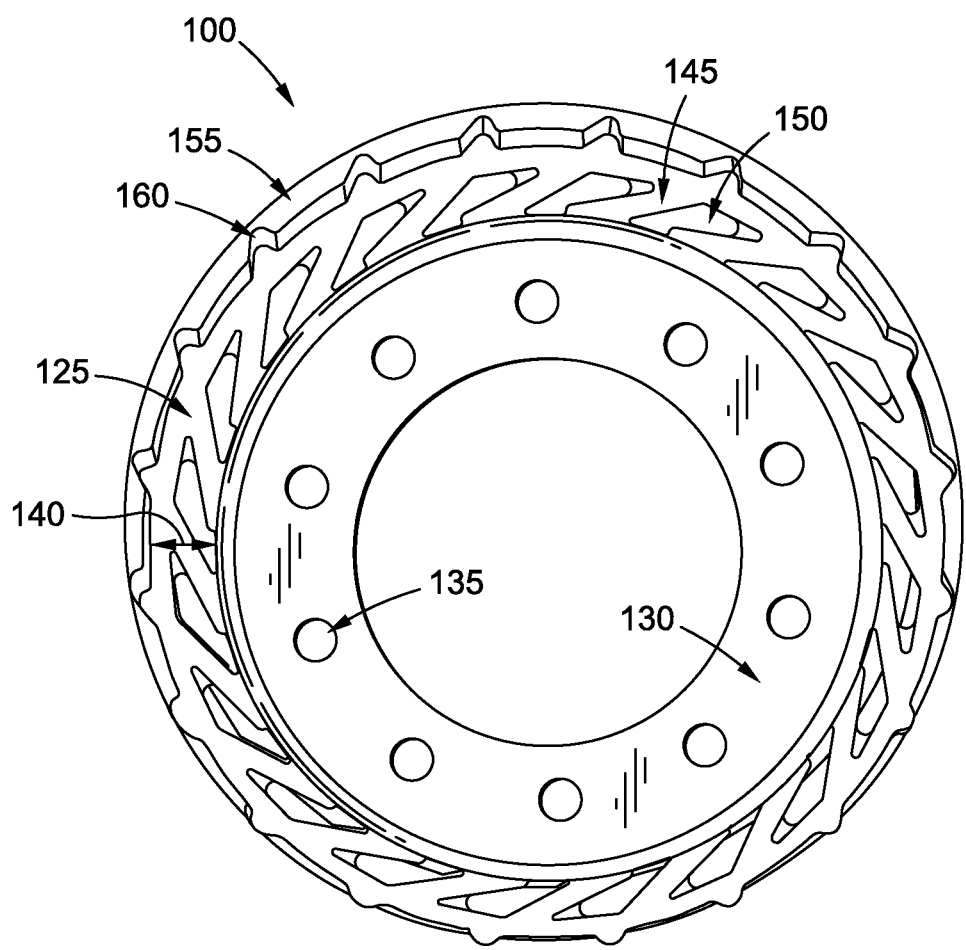
FIG. 2 is a plan view of the brake drum of FIG. 1.

Referring now to FIG. 2, depicted is a plan view of the brake drum 100 of FIG. 1 viewed from the end having the hub attachment section 130 and lug holes 135. As previously described with respect to FIG. 1, FIG. 2 similarly depicts the drum wall connection section 140 extending between the attachment end 125 of the drum wall 100 and the hub attachment section 130.

Also depicted in FIG. 2 are the plurality of radially angled vanes 145 interspersed with a corresponding plurality of air openings 150. As described above, the radially angled vanes 145 may be oriented at an angle of between 20 degrees and 50 degrees as measured from an edge of the drum wall (i.e., attachment end 125) from which the plurality of radially angled vanes 145 extend. Moreover, the plurality of radially angled vanes 145 are arranged such that they encircle the hub attachment section 130, as shown in FIG. 2. Again, the plurality of radially angled vanes 145 may preferably be curved such that their respective lengths are greater than a radial width of the drum wall connection section 140, thereby enabling additional expansion capacity during operational rotation of the drum 100.

The above-mentioned squealer band 155 circumferentially positioned around the outer surface of the drum 100 is also depicted in FIG. 2. Moreover, the optional strengthening ribs 160, positioned in this embodiment circumferentially around and parallel to the outer surface of the drum 100, are also shown in FIG. 2.

Figure 3:
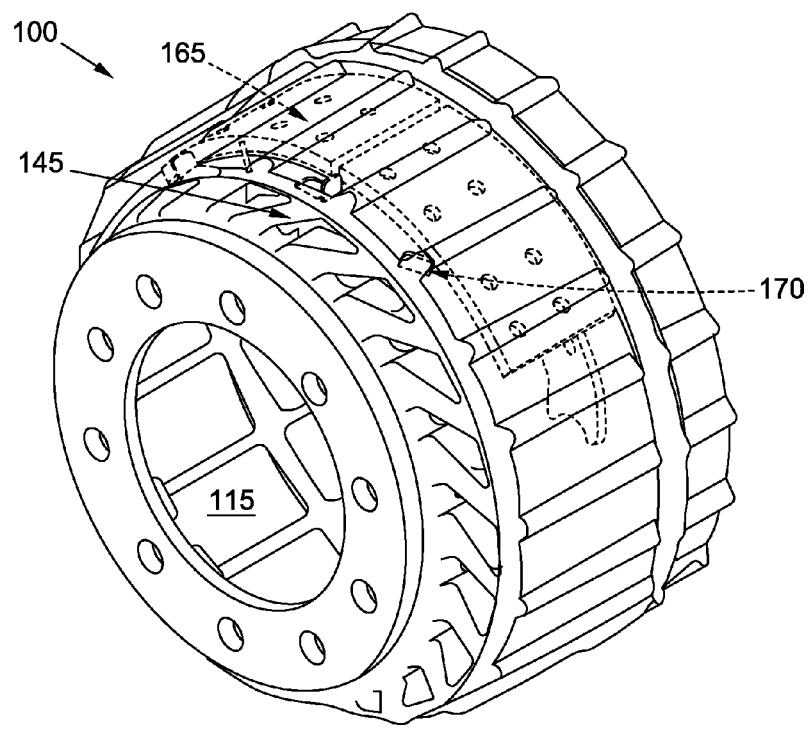
FIG. 3. is a partially transparent view of the brake drum of FIG. 1 showing one or more additional aspects of the invention.

FIG. 3 depicts a partially transparent view showing a brake shoe 165 disclosed along the inner braking surface 115 of the drum 100. As mentioned above, in certain embodiments, a stationary stator piece 170 may be disposed within the drum and behind the radially angled vanes 145, either attached directly to the brake shoe 165 or not. The stator piece 170 may preferably contribute to pulling air into the brake while the radially angled vanes 145 rotate and further circulate the air.

Figure 4:
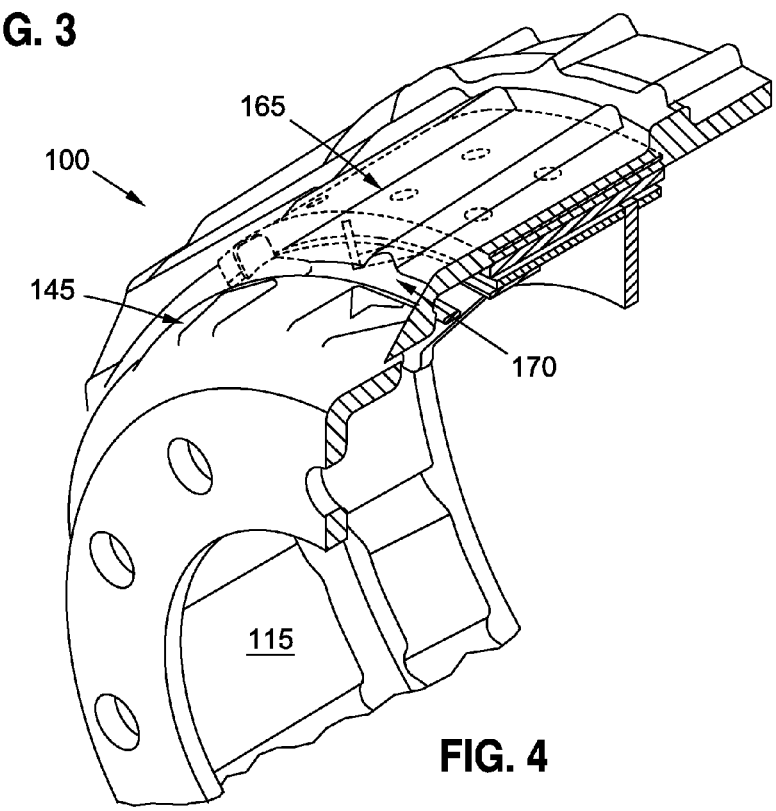
FIG. 4 depicts an additionally broken out partial view of FIG. 3.

FIG. 4 depicts an additionally broken out partial view of one embodiment for how the brake shoe 165 and stator piece 170 may be disposed along the inner braking surface 115 of the drum 100.

Figure 5A:
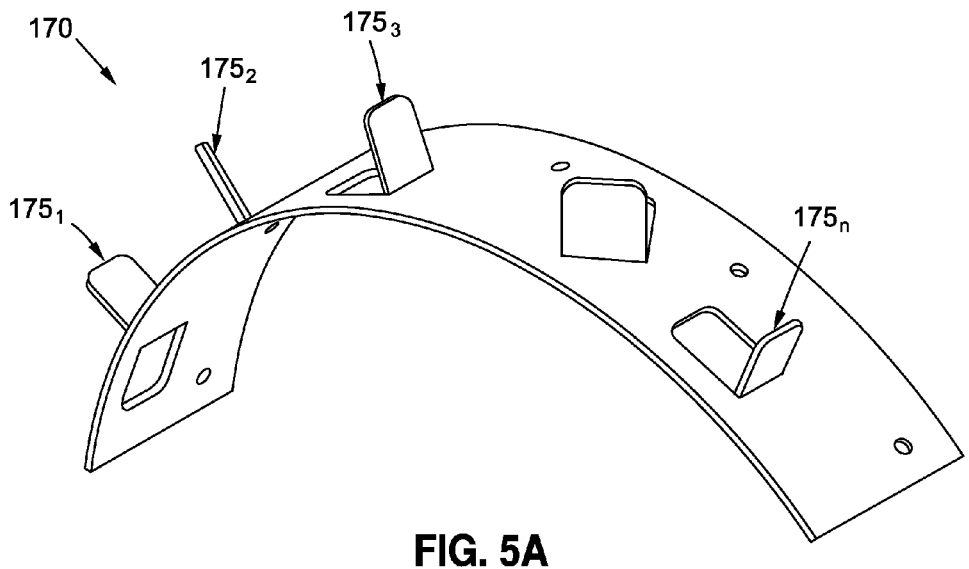
FIGS. 5A-5B are perspective views of one embodiment of the stationary stator piece of FIGS. 3 and 4.
Figure 5B:
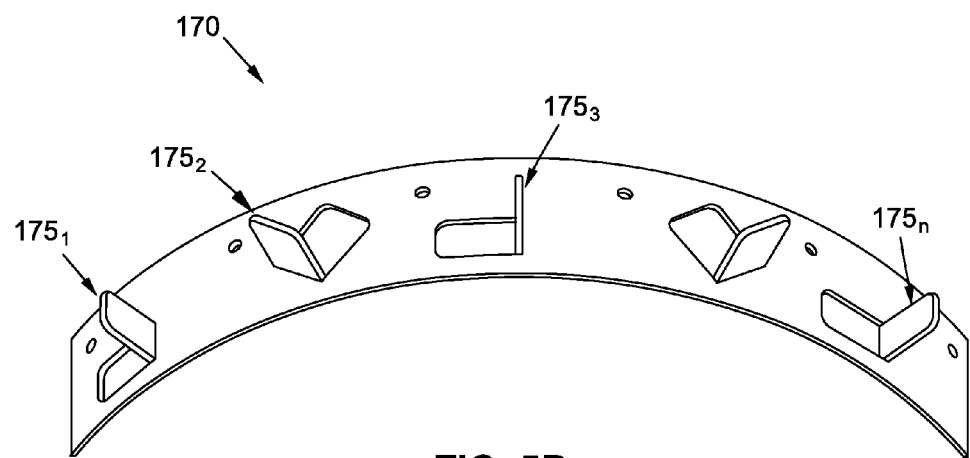

Referring now to FIGS. 5A-5B, depicted are two different perspective views of the stator piece 170 from FIGS. 4 and 5 above. The stator piece 170 is preferably configured to have some number of external flow blades $175_1$-$175_n$, and to be attached to a stationary part of the wheel end. In this fashion, the stator piece 170 may additionally serve to further direct the rotating air to create a positive directional flow through the turbo-style hub.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A drum for a drum brake assembly, the drum comprising:
   an annular drum wall having an open end and an attachment end, wherein the drum wall further comprises an outer drum surface and an inner braking surface each of which extends between the open end and the attachment end;
   a hub attachment section that is attachable to an associated wheel hub, wherein the hub attachment section extends radially about the attachment end of the drum wall forming a primary opening into which the associated wheel hub is receivable; and
   a drum wall connection section extending between the attachment end of the drum wall and the hub attachment section, wherein the drum wall connection section comprises a plurality of radially angled vanes interspersed with a corresponding plurality of air openings, wherein the plurality of radially angled vanes are curved such that a length of the plurality of radially angled vanes is greater than a radial width of the drum wall connection section, and wherein each of the plurality of air openings is circumferentially enclosed at an inner radial end by the hub attachment section and, at an outer radial end, by the attachment end of the drum wall, wherein the plurality of radially angled vanes are structurally configured to provide a radial expansion of the attachment end of the drum wall during operational rotation of the drum that reduces a bell mouthing effect at the open end of the drum wall during operational rotation of the drum.

2. The drum of claim 1, wherein the hub attachment section comprises a planar surface having an outer diameter from which the drum wall connection section extends.

3. The drum of claim 1, wherein the plurality of radially angled vanes are oriented at an angle of between 20 degrees and 50 degrees as measured from an edge of the drum wall from which the plurality of radially angled vanes extend.

4. The drum of claim 1, wherein the bell mouthing effect is characterized by a difference between the radial expansion of the attachment end of the drum wall and the radial expansion of the open end of the drum wall.

5. The drum of claim 1, wherein the plurality of radially angled vanes comprises between 2 and 30 individual vanes.

6. The drum of claim 1, wherein the plurality of radially angled vanes have a radially convex orientation.

7. The drum of claim 1, wherein the plurality of air openings are configured to facilitate air flow along the inner braking surface of the drum.

8. The drum of claim 1, wherein the drum is cast as a unitary construction.

9. The drum of claim 1, further comprising a stationary stator piece disposed within the annular drum wall and behind the plurality of radially angled vanes, and wherein the stationary stator piece comprise a plurality of external flow blades configured to pull additional air into the brake during rotation of the plurality of radially angled vanes.

10. A drum brake assembly comprising:
a drum having an annular drum wall with an open end and an attachment end, wherein the drum wall further comprises an outer drum surface and an inner braking surface each of which extends between the open end and the attachment end,
wherein the drum comprises a hub attachment section that is attachable to an associated wheel hub, wherein the hub attachment section extends radially about the attachment end of the drum wall forming a primary opening into which the associated wheel hub is receivable, and
wherein the drum further comprises a drum wall connection section extending between the attachment end of the drum wall and the hub attachment section, wherein the drum wall connection section comprises a plurality of radially angled vanes interspersed with a corresponding plurality of air openings, wherein the plurality of radially angled vanes are curved such that a length of the plurality of radially angled vanes is greater than a radial width of the drum wall connection section, and wherein each of the plurality of air openings is circumferentially enclosed at an inner radial end by the hub attachment section and, at an outer radial end, by the attachment end of the drum wall, wherein the plurality of radially angled vanes are structurally configured to provide a radial expansion of the attachment end of the drum wall during operational rotation of the drum that reduces a bell mouthing effect at the open end of the drum wall during operational rotation of the drum.

11. The drum brake assembly of claim 10, wherein the hub attachment section comprises a planar surface having an outer diameter from which the drum wall connection section extends.

12. The drum brake assembly of claim 10, wherein the plurality of radially angled vanes are oriented at an angle of between 20 degrees and 50 degrees as measured from an edge of the drum wall from which the plurality of radially angled vanes extend.

13. The drum brake assembly of claim 10, wherein the bell mouthing effect is characterized by a difference between the radial expansion of the attachment end of the drum wall and the radial expansion of the open end of the drum wall.

14. The drum brake assembly of claim 10, wherein the plurality of radially angled vanes comprises between 2 and 30 individual vanes.

15. The drum brake assembly of claim 10, wherein the plurality of radially angled vanes have a radially convex orientation.

16. The drum brake assembly of claim 10, wherein the plurality of air openings are configured to facilitate air flow along the inner braking surface of the drum.

17. The drum brake assembly of claim 10, wherein the drum is cast as a unitary construction.

18. The drum brake assembly of claim 10, further comprising a stationary stator piece disposed within the annular drum wall and behind the plurality of radially angled vanes, and wherein the stationary stator piece comprise a plurality of external flow blades configured to pull additional air into the brake during rotation of the plurality of radially angled vanes.

19. A method of cooling a drum for a brake assembly, wherein the drum includes an annular drum wall having an open end and an attachment end, and further includes a hub attachment section for attaching the drum to an associated wheel hub, wherein the hub attachment section extends radially about the attachment end of the drum wall forming a primary opening into which the associated wheel hub is receivable, the method comprising:
rotating the annular drum wall; and
cooling, during said rotating, the annular drum wall using air circulated by a plurality of radially angled vanes that are disposed between the attachment end of the annular drum wall and the hub attachment section, wherein the plurality of radially angled vanes are interspersed with a corresponding plurality of air flow openings configured to facilitate air flow along an inner braking surface of the annular drum wall, wherein the plurality of radially angled vanes are curved such that a length of the plurality of radially angled vanes is greater than a radial width of the drum wall connection section, and wherein each of the plurality of air flow openings is circumferentially enclosed at an inner radial end by the hub attachment section and, at an outer radial end, by the attachment end of the drum wall, wherein the plurality of radially angled vanes are structurally configured to provide a radial expansion of the attachment end of the drum wall during operational rotation of the drum that reduces a bell mouthing effect at the open end of the drum wall during operational rotation of the drum.

* * * * *